US008385349B2

(12) United States Patent
Yuang et al.

(10) Patent No.: US 8,385,349 B2
(45) Date of Patent: Feb. 26, 2013

(54) MEDIUM ACCESS CONTROL DEVICE AND METHOD FOR OPTICAL PACKET-SWITCHED METRO WDM SLOTTED-RING NETWORKS

(75) Inventors: Chi-Jui Maria Yuang, Hsinchu (TW); I-Fen Chao, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 465 days.

(21) Appl. No.: 12/769,452

(22) Filed: Apr. 28, 2010

(65) Prior Publication Data

US 2011/0158646 A1 Jun. 30, 2011

(30) Foreign Application Priority Data

Dec. 25, 2009 (TW) ................................ 98145140 A

(51) Int. Cl.
*H04L 12/28* (2006.01)
*H04L 12/56* (2006.01)
*H04L 12/43* (2006.01)
*H04B 7/212* (2006.01)

(52) U.S. Cl. ...................... 370/395.2; 370/444; 370/460

(58) Field of Classification Search ........................ None
See application file for complete search history.

(56) References Cited

U.S. PATENT DOCUMENTS

| | | | |
|---|---|---|---|
| 6,477,167 B1 * | 11/2002 | Wu | 370/395.21 |
| 6,842,463 B1 * | 1/2005 | Drwiega et al. | 370/468 |
| 6,922,409 B1 * | 7/2005 | Medhat et al. | 370/395.2 |
| 7,126,910 B1 * | 10/2006 | Sridhar | 370/229 |
| 7,596,088 B2 * | 9/2009 | Agmon et al. | 370/230 |
| 2007/0183368 A1 * | 8/2007 | Stavinov | 370/332 |

OTHER PUBLICATIONS

Nen-Fu Huang, Guan-Hsiung Liaw and Chung-Ching Chiou, On the Isochronous Path Selection Problem in an Interconnected WDM Network, Mar. 1996, Journal of Lightwave Technology, vol. 14, No. 3, pp. 304-314.*
Angelopoulos et al., A MAC Protocol For Efficient Multiplexing QoS-Sensitive and Best-Effort Traffic In Dynamically Configurable WDM Rings, Computer Networks 44, 2004, pp. 305-317.
Marsan et al., All-Optical WDM Multi-Rings With Differentiated QoS, IEEE Communications Magazine, Feb. 1999, pp. 58-66.
Bengi et al., Efficient QoS Support In a Slotted Multihop WDM Metro Ring, IEEE Journal On Selected Areas In Communications, Jan. 2002, pp. 216-227, vol. 20, No. 1.

* cited by examiner

*Primary Examiner* — Chirag Shah
*Assistant Examiner* — Ashley Shivers
(74) *Attorney, Agent, or Firm* — Morris Manning & Martin LLP; Tim Tingkang Xia, Esq.

(57) ABSTRACT

A medium access control (MAC) device and method for optical packet-switched metro wavelength division multiplexing (WDM) slotted-ring networks are used for providing quality of service (QoS) guarantees for isochronous traffic. The device includes a MAC processor and a distributed call admission control (CAC) module. The CAC module in each node of an optical packet-switched network is designed in a distributed manner, and flexibly allocates a reserved bandwidth to an isochronous traffic by a mean-rate-reservation method, controls a quota of the isochronous traffic below a quota ratio rH, resolves output contention by recording node locations forming a connection, and establishes a connection for each isochronous traffic. The MAC processor establishes a connection in the reserved bandwidth for each isochronous traffic between the nodes according to control information carried in a control channel, controls uploading, unloading, and erasing of a plurality of data channels, and updates corresponding contents in the control information.

19 Claims, 14 Drawing Sheets

FIG.9

MEDIUM ACCESS CONTROL DEVICE AND METHOD FOR OPTICAL PACKET-SWITCHED METRO WDM SLOTTED-RING NETWORKS

CROSS-REFERENCE TO RELATED APPLICATIONS

This non-provisional application claims priority under 35 U.S.C. §119(a) on Patent Application No(s). 098145140 filed in Taiwan, R.O.C. on Dec. 25, 2009, the entire contents of which are hereby incorporated by reference.

BACKGROUND

1. Field

The disclosure relates to a medium access control (MAC) device and method for optical packet-switched metro wavelength division multiplexing (WDM) slotted-ring networks, which are used for providing quality of service (QoS) guarantees for isochronous traffic.

2. Related Art

Metro networks mainly include synchronous optical network/synchronous digital hierarchy (SONET/SDH) ring networks. Due to the advantages of simple network architecture, easy implementation using add-drop multiplexers (ADMs), and capability of providing high-speed protection switching, ring networks can meet high survivability requirements, and are thus always the main network architecture for metro networks. A SONET/SDH network is circuit switched based in nature, and is quite advantageous for constant bit rate (CBR) applications such as voice service. However, for variable bit rate (VBR) applications such as data service, network resources are wasted.

In recent years, the flow size of the data service has exceeded the voice service, and the difference becomes increasingly larger. Therefore, it is necessary to design a MAC technology for optical packet-switched metro WDM slotted-ring networks that is suitable for burst traffic, so as to satisfy fair bandwidth allocation, and achieve QoS guarantees for isochronous traffic.

M. Marsan, A. Bianco, E. Leonardi, A. Morabito, and F. Neri et al., in "All-Optical WDM Multi-Rings with Differentiated QoS", IEEE Communications Magazine, vol. 37, no. 2, February 1999, pp. 58-66, disclosed a synchronous round robin with reservation ($SR^3$) mechanism for establishing a connection with a reserved bandwidth, in which a call admission control (CAC) mechanism implements connection admission management using token-like signals by broadcast. In this method, 2 to 3 ring time is required for establishing a connection, and the number N of nodes and the number W of data channels in the ring network are required to be equal, so that the system is not flexible.

In addition, K. Bengi and H. Van As et al., in "Efficient QoS Support in a Slotted Multihop WDM Metro Ring", IEEE Journal on Selected Areas in Communications, vol. 20, no. 1, January 2002, pp. 216-227, proposed another similar technology, except that this system allows the number N of nodes to be larger than the number W of data channels in the ring network. This system architecture is more flexible as compared with the above technology, but still requires a long period of time for establishing a connection.

In the above two conventional technologies, the former one is to provide a reserved bandwidth for a certain pair of source-destination nodes, the latter one is to provide a reserved bandwidth for a certain destination node, and an address of the reserved bandwidth is fixed at a certain wavelength of a specific slot, instead of being flexibly allocated according to the requirements.

H. Leligou, J. Angelopoulos, C. Linardakis, and A. Stavdas et al., in "A MAC protocol for efficient multiplexing QoS-sensitive and best-effort traffic in dynamically configurable WDM rings", Journal of Computer Networks, vol. 44, no. 3, February 2004, pp. 305-317, proposed a centralized CAC mechanism for establishing a connection with a reserved bandwidth. In this conventional technology, bandwidth will be marked whenever high priority data cannot be sent out, which compresses the bandwidth of other low priority data.

SUMMARY

Accordingly, the disclosure is directed to a MAC device and method for optical packet-switched metro WDM slotted-ring networks, which are applied in a node of an optical packet-switched metro WDM slotted-ring network, for providing data transmission services.

According to an exemplary embodiment of the disclosure, the MAC device comprises a CAC module and a MAC processor.

The CAC module is configured in the node of the optical packet-switched metro WDM slotted-ring network in a distributed manner. The CAC module flexibly allocates a reserved bandwidth to an isochronous traffic by a mean-rate-reservation method, controls a quota of the isochronous traffic below the reserved bandwidth, and determines whether to accept a connection establishment request initiated by the isochronous traffic.

The MAC processor is used for establishing a connection in the reserved bandwidth for the isochronous traffic accepted by the CAC module according to control information recorded in a control slot in a control channel, controlling data uploading, unloading, and erasing of a plurality of data channels, and updating corresponding contents in the control information.

According to an exemplary embodiment of the disclosure, the MAC device further comprises a remaining quota allocation module. The remaining quota allocation module in accordance with a probabilistic quota and credits to determine whether transmit unreserved traffic (e.g., VBR traffic, ABR traffic) by remaining quota. The remaining quota, which is equal to Q minus the total amount of the mean rate of the accepted connections, is all for transmitting unreserved traffic.

According to an exemplary embodiment of the disclosure, the MAC method comprises: establishing control information corresponding to a data packet in the network in a minislot; determining a reserved bandwidth and a remaining quota according to a quota Q of the node within a single cycle and a quota ratio rH; flexibly allocating the reserved bandwidth to an isochronous traffic initiating a connection establishment request by a mean-rate-reservation method; and establishing a connection for the isochronous traffic in the reserved bandwidth.

According to an exemplary embodiment of the disclosure, the MAC method further comprises: allocating the remaining quota in accordance with a probabilistic quota and a credit for determine whether transmit unreserved traffic (e.g., VBR traffic, ABR traffic) by remaining quota.

BRIEF DESCRIPTION OF THE DRAWINGS

The disclosure will become more fully understood from the detailed description given herein below for illustration only, and thus are not limitative of the disclosure, and wherein:

FIG. 7-1 shows an example of data transmission in the optical packet-switched ring network according to the disclosure;

FIG. 7-2 is a schematic view of a data flow in FIG. 7-1 according to the disclosure;

FIG. 8-1 shows another example of data transmission in the optical packet-switched ring network according to the disclosure;

FIG. 8-2 is a schematic view of a data flow in FIG. 8-1 according to the disclosure;

FIG. 9 is a schematic view of a data flow of a request from an isochronous traffic for establishing a connection in the optical packet-switched ring network according to the disclosure;

FIG. 13-1 shows simulated results of a delay of a VBR isochronous traffic according to the disclosure; and FIG. 13-2 shows simulated results of a delay/jitter of a VBR isochronous traffic according to the disclosure.

DETAILED DESCRIPTION OF THE INVENTION

Figure 1:
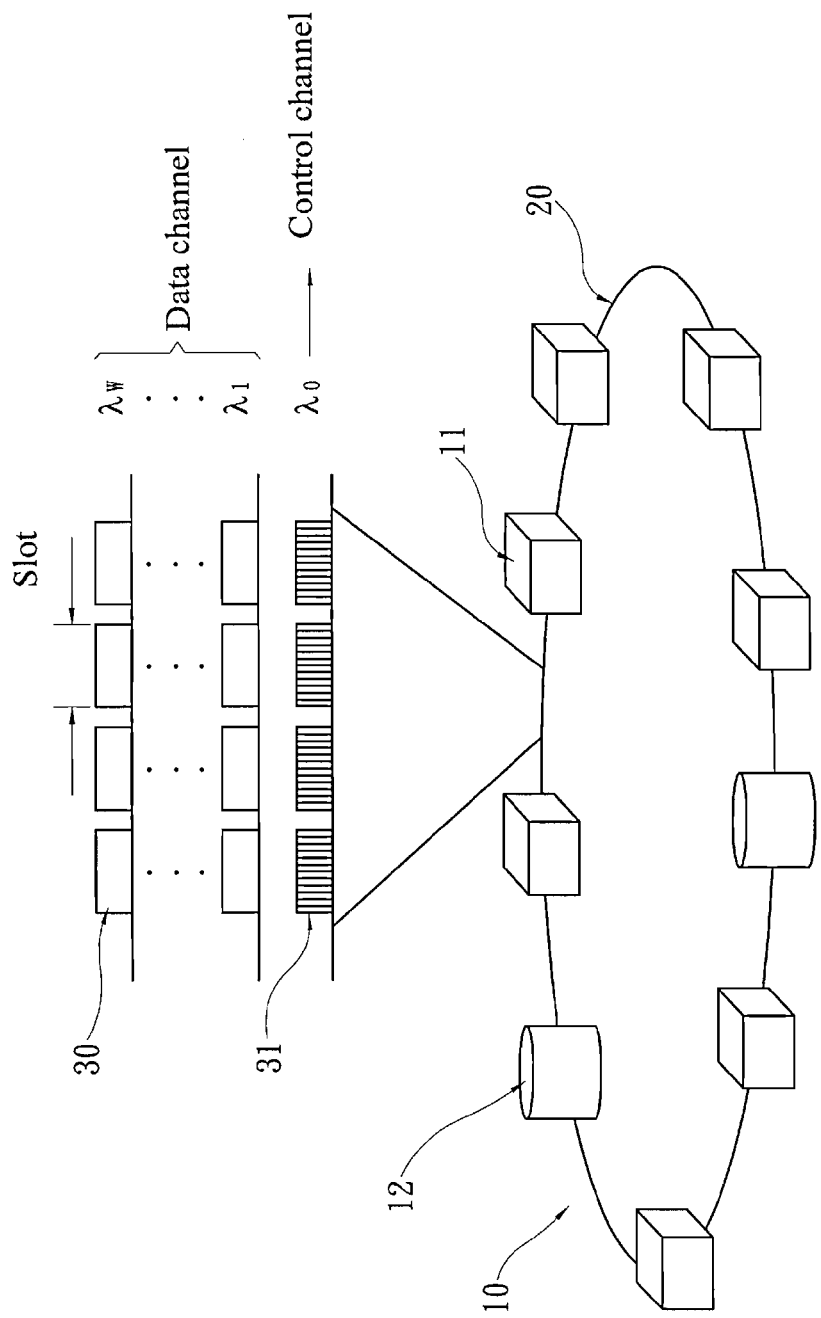
FIG. 1 shows an example of a topological structure of an optical packet-switched ring network according to the disclosure.

In the disclosure, the network topology and node system architecture suitable for the device and method of the disclosure are designed by taking optical packet-switched metro WDM slotted-ring networks as an example. FIG. 1 shows an example of a topological structure of an optical packet-switched ring network according to an exemplary embodiment. The optical packet-switched ring network 10 comprises a plurality of ordinary nodes 11 and at least one server node 12, which may all be server nodes 12, though the hardware cost is much higher. For ease of distinguishing, in FIG. 1 and similar drawings disclosed hereinafter, a cube is used to represent the ordinary node 11, and a cylinder is used to represent the server node 12. The nodes (comprising the ordinary nodes 11 and the server node 12) are connected with each other through at least one optical fiber 20 to form a ring network. According to the number of the optical fiber 20 used, the ring network may be a single-ring network using one optical fiber 20, or a dual-ring network using two optical fibers 20. The dual-ring network is advantageous in that transmission interruption caused by any node failure, damage to the optical fibers, or other reasons may be avoided.

The optical packet-switched ring network adopts optical fiber WDM, and optical signals of different wavelengths are used for transmitting data and a control signal in the optical fiber 20. A single optical fiber 20 has W data channels and one control channel. The W data channels $\lambda 1, \lambda 2, \ldots, \lambda w$ respectively use optical signals of different wavelengths to transmit data (where W is an integer greater than 1), and the control signal of the control channel $\lambda 0$ is transmitted using an optical signal of another wavelength. The data channels $\lambda 1, \lambda 2, \ldots, \lambda w$ and the control channel $\lambda 0$ are respectively divided into a plurality of data packets 30 and a corresponding control slot 31 by a slot having a fixed time length at a synchronous position (referring to a position in the same vertical direction in FIG. 1). The data packets 30 are used for carrying data to be transmitted. The time length of the slot determines the data amount carried by each data packet 30. What's more, each control slot 31 further records control information of the plurality of data packets 30 in each corresponding data channel $\lambda 1, \lambda 2, \ldots, \lambda w$ at the synchronous position, which will be described in detail hereinafter.

Figure 2:
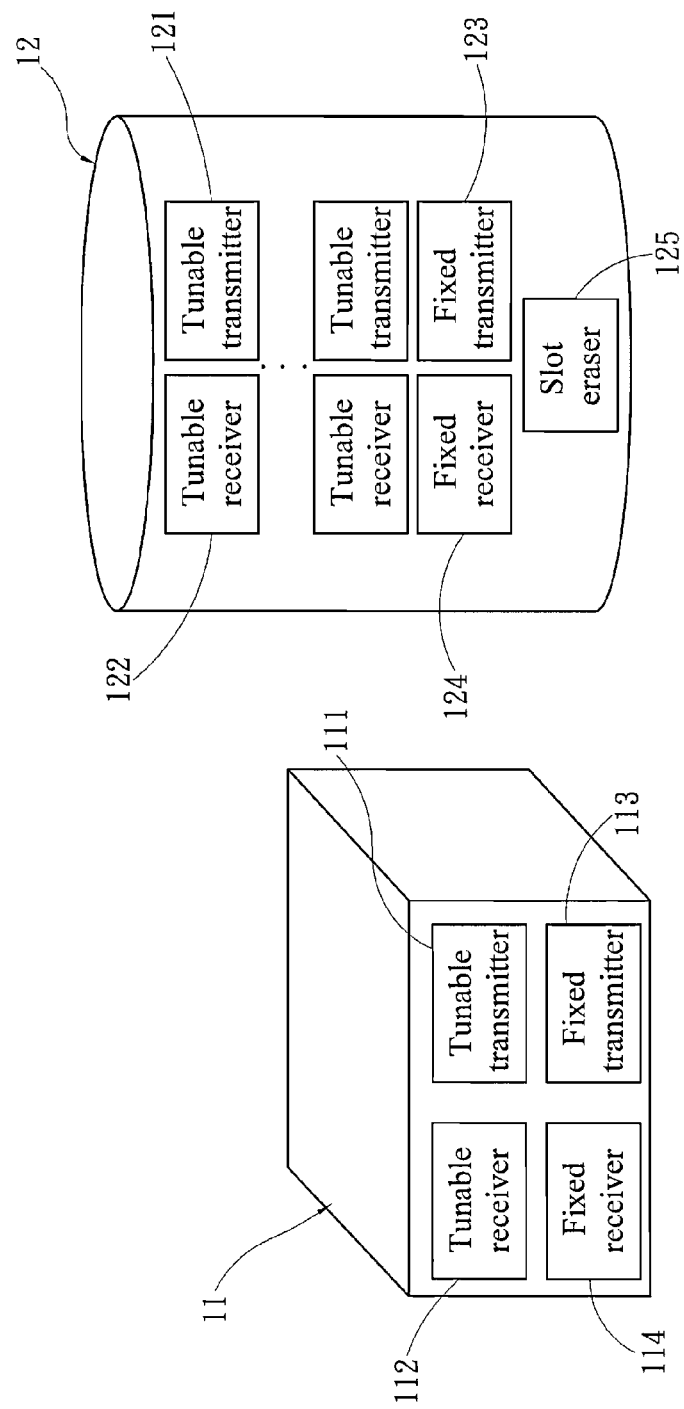
FIG. 2 shows an example of an architecture of an ordinary node and a server node according to the disclosure.

In an example shown in FIG. 2, an ordinary node 11 comprises: a tunable transmitter 111 and a tunable receiver 112, disposed on a single optical fiber 20, and used for performing data transmission and receiving in the data channels $\lambda 1, \lambda 2, \ldots, \lambda w$; and a fixed transmitter 113 and a fixed receiver 114, disposed on the optical fiber 20, and used for performing transmission and receiving of the control signal in the control channel $\lambda 0$, in particular, for transmitting and receiving the control slots 31 in the control channel. A server node 12 comprises: one or more tunable transmitters 121 and tunable receivers 122, for performing data transmission and receiving in the data channels $\lambda 1, \lambda 2, \ldots, \lambda w$; one fixed transmitter 123 and one fixed receiver 124, for performing transmission and receiving of the control signal in the control channel $\lambda 0$; and one slot eraser 125, for erasing the data packets 30 in the data channels $\lambda 1, \lambda 2, \ldots, \lambda w$ that have been read, so as to release the bandwidth for reuse, thereby improving the bandwidth utilization. Compared with two conventional network architectures adopting source stripping and destination stripping, the disclosure adopts a stripping mode performed by the server node 12, with a hardware cost lower than the two conventional architectures and an overall performance between the two architectures. Moreover, the transmitters and receivers may be implemented using ADMs.

Figure 3:
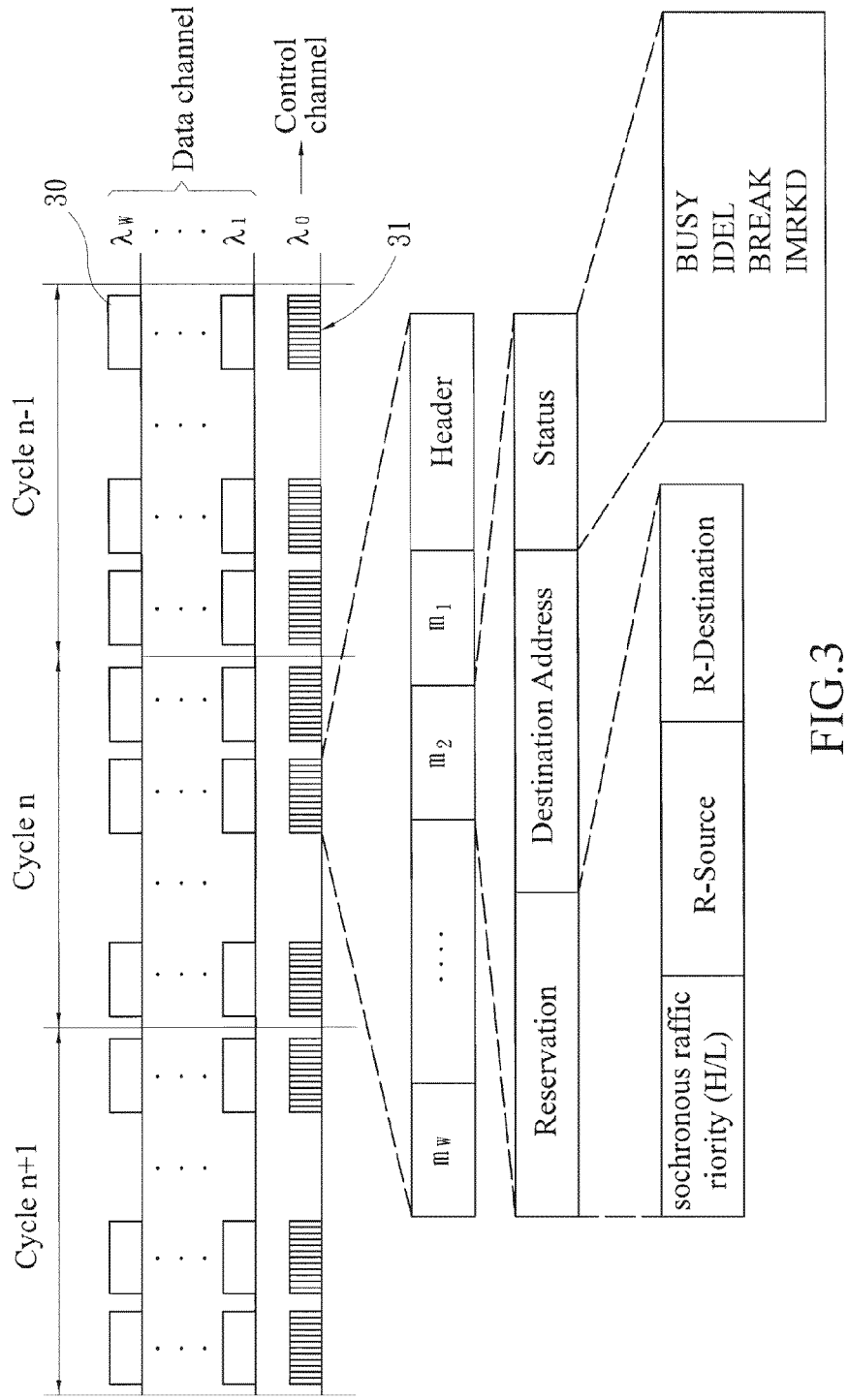
FIG. 3 shows an example of a data structure of data packets, slots, cycles, and windows according to the disclosure.

FIG. 3 shows an example for illustrating a relation between the data packets 30, slots, cycles, and windows in the plurality of data channels $\lambda 1, \lambda 2, \ldots, \lambda w$. Each cycle has a fixed number of slots, and a window has a fixed number of cycles. In an optical packet-switched ring network, each time data is transmitted between any two nodes (comprising the ordinary nodes 11 and the server node 12), a connection needs to be established between a source node and a destination node. At least one ring time is required for establishing the connection. After the connection is established, a reserved bandwidth is used to transmit the data. The number of slots in the cycle and the number of cycles in the window are system parameters. During the operation of the system, the two parameters are fixed constants. The fixed constants may be preset by the system. Each control slot 31 in the control channel $\lambda 0$ comprises W mini-slots m1, m2, ..., mw−1, mw and one header. The W mini-slots m1, m2, ..., mw−1, mw respectively record the control information of the data packets 30 in the corresponding W data channels $\lambda 1, \lambda 2, \ldots, \lambda w$ at the synchronous position. A structure of the control information of each mini-slot m1, m2, ..., mw−1, mw in the control slot 31 of the control channel $\lambda 0$ as shown in FIG. 3 comprises: "bandwidth reservation information" (Reservation), "destination address information" (Destination Address), and "status information" (Status).

The "status information" is used for recording a use status of the data packet 30 in each of the W data channels λ1, λ2, ..., λw respectively corresponding to the mini-slots m1, m2, ..., mw−1, mw at the synchronous position, with four different use status indicators, namely, BUSY, BUSY/READ (BREAD), IDLE, and Idle Marked (IMRKD). The "destination address information" records a destination to which the corresponding data packet 30 is to be transmitted. The "bandwidth reservation information" is an important index for determining whether the bandwidth of the corresponding data packet 30 may be used to establish the connection of the isochronous traffic. The "bandwidth reservation information" comprises: "isochronous traffic priority" (H/L), "H" indicating that the isochronous traffic is of a high priority, "L" indicating that the isochronous traffic is of a low priority, and "L" being used as an initial value; "source node location" (R-Source), and "destination node location" (R-Destination). The R-Source and R-Destination are used to mark a source node and a destination node of a connection of the isochronous traffic established in the reserved bandwidth.

Figure 4:
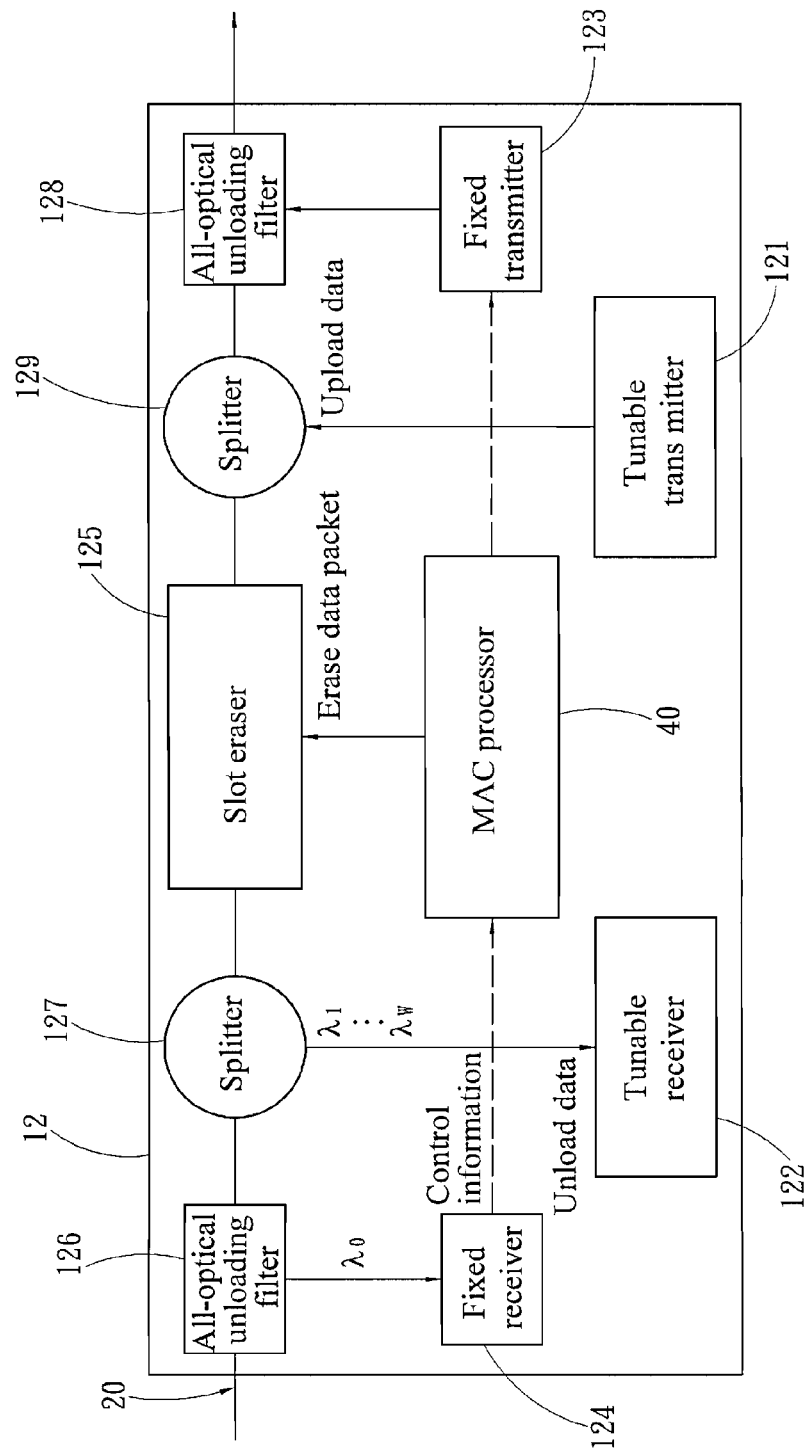
FIG. 4 shows an example of an architecture of a server node according to the disclosure.

FIG. 4 shows an example of an architecture of a server node 12. Taking an optical packet-switched single-ring network using a single optical fiber 20 as an example, a fixed all-optical unloading filter 126 may be used to filter out signals of the control slot 31 in the control channel λ0. The fixed receiver 124 converts the optical signals into electrical signals, and a MAC processor 40 decodes the control information recorded in the mini-slots m1, m2, ..., mw−1, mw. When the control information is resolved and processed, the data packets 30 are still transmitted in the optical fiber network. After the control information is obtained, the use status of each data packet 30 in the W data channels λ1, ..., λw as well as the destination to which the data packet 30 is to be transmitted can be obtained. Then, the MAC processor 40 determines whether to perform operations such as uploading, unloading, and erasing of the data packet 30. For example, a splitter 127 splits the data packet 30 in a certain data channel λ1, ..., λw to a tunable receiver 122 for data unloading, or a tunable transmitter 121 is used to add data to be uploaded into the data packet 30 of a certain data channel λ1, ..., λw in the optical fiber 20 through a splitter 129. After a certain data channel 30 is downloaded by a certain receiver node, a slot eraser 125 may be further used to erase the data packet 30 that has been read. If necessary, the MAC processor 40 further records contents of the updated control information to the corresponding mini-slots m1, m2, ..., mw−1, mw in the control channel λ0, and a fixed transmitter 123 adds the contents into the control channel λ0 of the optical fiber 20 through a fixed all-optical unloading filter 128, so as to transmit the contents to other downstream nodes.

Figure 5:
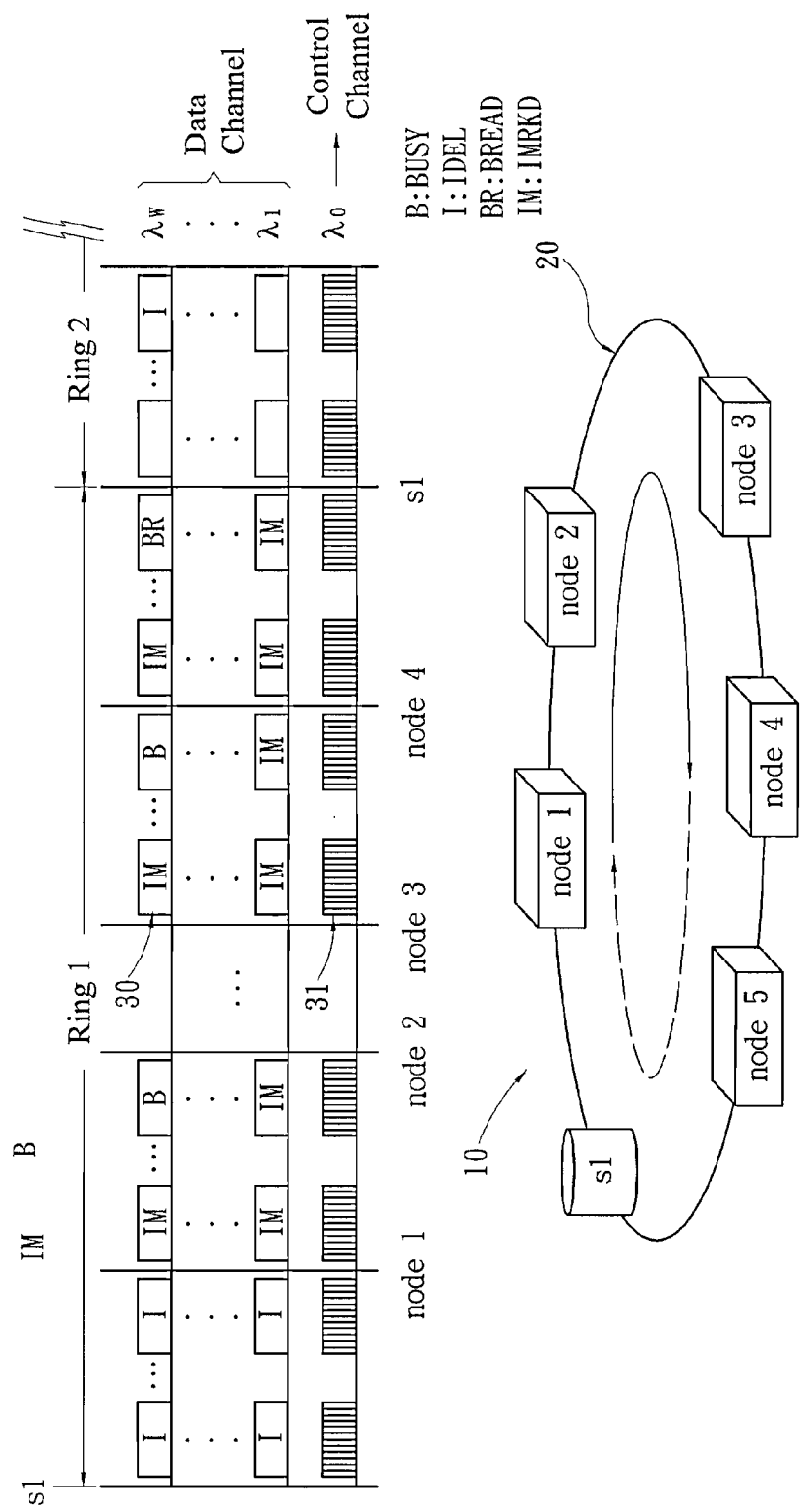
FIG. 5 shows another example of the topological structure of the optical packet-switched ring network according to the disclosure.

FIG. 5 takes an optical packet-switched ring network comprising five ordinary nodes sequentially marked as Node 1 to Node 5 and one server node s1 as an example to illustrate the setting of the four different use status indicators of the "status information". It is assumed that a quota Q allocated by system parameters to Node 1 is four data packets 30, but currently Node 1 only needs to transmit one data packet 30 to Node 4, so that Node 1 has to find an empty control slot 31 first, in other words, find a mini-slot (assumed to be m6) with the "status information" marked as IDLE, then add data to be transmitted into the data packet λ6 of a certain data channel corresponding to the mini-slot m6, and update the "status information" of the mini-slot m6 to BUSY. Since Node 1 still has unused quota of three data packets, Node 1 arbitrarily finds three mini-slots with the "status information" marked as IDLE, and updates the "status information" to IMRKD for use by the downstream nodes Node 2 to Node 5, so as to improve the bandwidth utilization. The data packet λ6 having carried data is transmitted to Node 4 according to a transmission direction of a data flow represented by arrows in FIG. 5. After receiving the data packet λ6, Node 4 updates the "status information" of the mini-slot m6 to BREAD. At this time, data in the data packet λ6 still exists, and the mini-slot m6 with the updated "status information" and the corresponding data packet λ6 are continuously transmitted to the server node s1. The server node s1 updates the "status information" of the mini-slot m6 to IDLE, and meanwhile uses the slot eraser 125 to erase the data in the data packet λ6, such that other nodes can reuse the bandwidth.

Based on the architecture of the optical packet-switched ring network as described above, and with a distributed CAC mechanism proposed below, the MAC device and method of the disclosure can flexibly establish a connection for the isochronous traffic, fairly allocate the bandwidth, and provide QoS guarantees for the isochronous traffic, thereby achieving high data output and low delay and delay/jitter.

Figure 6:
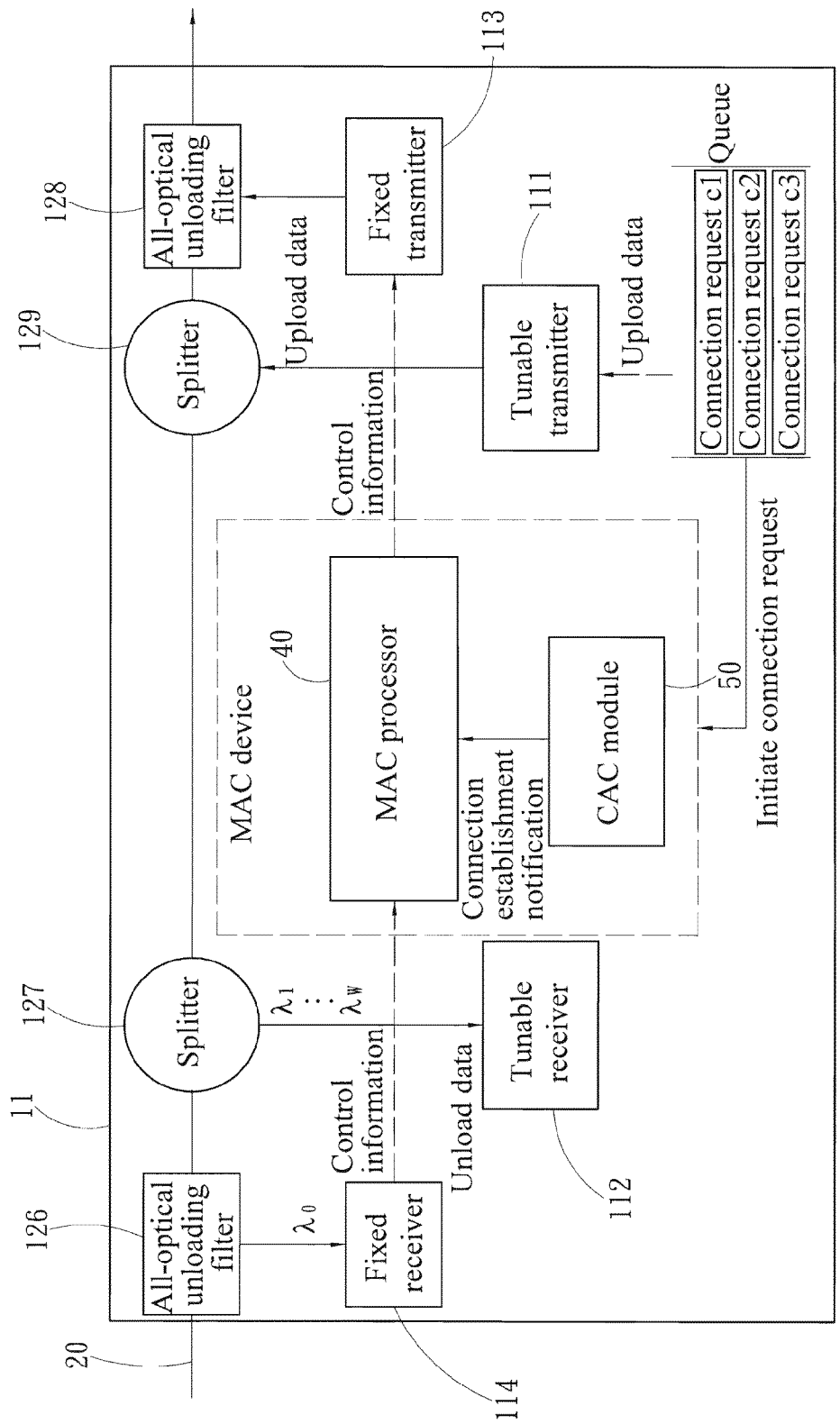
FIG. 6 shows an example of an architecture of a MAC device according to the disclosure.

FIG. 6 shows an example of the MAC device 40 of the disclosure. The MAC device 40 is configured in each node (comprising the ordinary nodes 11 and the server node 12) of an optical packet-switched ring network. The MAC device 40 comprises a MAC processor 40 and a CAC module 50. The CAC module 50 in each node of the optical packet-switched ring network is designed in a distributed manner, and flexibly allocates a reserved bandwidth to an isochronous traffic by a mean-rate-reservation method, controls a quota of the isochronous traffic below a bounded value VB, resolves output contention by recording node locations forming a connection, and determines whether to accept a connection establishment request initiated by the isochronous traffic. The MAC processor 40 establishes a connection in the reserved bandwidth for the isochronous traffic accepted by the CAC module 50 according to control information recorded by a control slot 31 in a control channel λ0, controls data uploading, unloading, and erasing of a plurality of data channels λ1, λ2, ..., λw (functions of the server node 12), and updates corresponding contents in the control information.

An example of the MAC method of the disclosure can use the MAC device of any node to establish a connection of the isochronous traffic by the following steps:

1. Establishing control information corresponding to a data packet in the network in the mini-slot;
2. Determining a reserved bandwidth and a remaining quota according to a quota Q of the node within a single cycle and a quota ratio rH;
3. Flexibly allocating the reserved bandwidth to an isochronous traffic initiating a connection establishment request by a mean-rate-reservation method; and
4. Establishing a connection for the isochronous traffic in the reserved bandwidth.

The MAC device 40 and the method thereof for establishing the connection of the isochronous traffic of the disclosure are illustrated below with reference to examples and drawings.

The CAC module 50 designed in the distributed manner means that the CAC module 50 in each node of the optical packet-switched ring network operates independently, and the request for establishing a connection of the isochronous traffic in any node is determined independently by the CAC module 50 of the node, without negotiating with the CAC modules 50 of other nodes. The CAC module 50 controls a quota of the isochronous traffic below a bounded value VB according to a quota Q of the node within a single cycle and a quota ratio rH. In other words, the bounded value VB is the reserved bandwidth provided for the isochronous traffic. The bounded value VB may be calculated by the following Formula (1).

$$VB = rH \times Q \qquad \text{Formula (1)}$$

After the CAC module 50 of the disclosure determines the reserved bandwidth according to the quota Q of the node within a single cycle and the quota ratio rH, a remaining quota exits. The highest functions of the remaining quota are to handle burstness of the isochronous traffic, and to serve as a bandwidth for use by other unreserved traffic. For example, available bit rate (ABR) traffic or other traffic can be transmitted by using the remaining quota. In the isochronous traffic comprising CBR, VBR, and ABR traffic, the reserved bandwidth in the optical packet-switched ring network is preferably preferentially used by the CBR and VBR isochronous traffic, in which both CBR and VBR are of a high priority (H), while ABR is of a low priority (L). The priority of the CBR and VBR isochronous traffic for establishing a connection in the reserved bandwidth may be represented by the "isochronous traffic priority" (H/L) in the "bandwidth reservation information". The remaining quota is provided for excessive ABR and VBR traffic than the reserved bandwidth. Unreserved VBR bandwidth has priority over the ABR.

The quota ratio rH is a system parameter and may be 0 to 1.0. The rH functions to determine an amount of reserved bandwidth for use by the isochronous traffic comprising CBR and VBR traffic according to an actual traffic flow of the optical packet-switched ring network, so that the rH can be flexibly adjusted according to the actual traffic flow of the optical packet-switched ring network. For high traffic burstness, the rH may be set to a small value so as to obtain a large amount of remaining quota; while for low traffic burstness, the rH may be set to a large value so as to obtain a large amount of reserved bandwidth. In other words, the rH may be 0.1 to 0.9, and generally, the rH is preferably set to 0.5 to 0.9. The quota Q may be calculated by the following Formula (2).

$$Q = ((C \times W)/N) \times f(n) \qquad \text{Formula (2)}$$

C is the total number of the slots in a single cycle, W is the number of the data channels, N is the total number of the nodes (comprising the ordinary nodes 11 and the server node 12), and $f(n) = (2 \times S)/(S+2)$.

S is the total number of the server nodes, and f(n) is a function associated with the total number of the server nodes. Since different numbers of the server nodes cause different amounts of reused bandwidth, the available Q value varies.

After a connection is established between two nodes, data is continuously transmitted until all the data has been transmitted, so that a plurality of cycles is required for data transmission. When the CAC module 50 flexibly allocates the reserved bandwidth, two allocation scenarios involving single reservation and double reservation exist according to the architecture of the optical packet-switched ring network and the data transmission direction between the nodes, which is illustrated below with reference to FIG. 7-1.

Figures 1, 7:
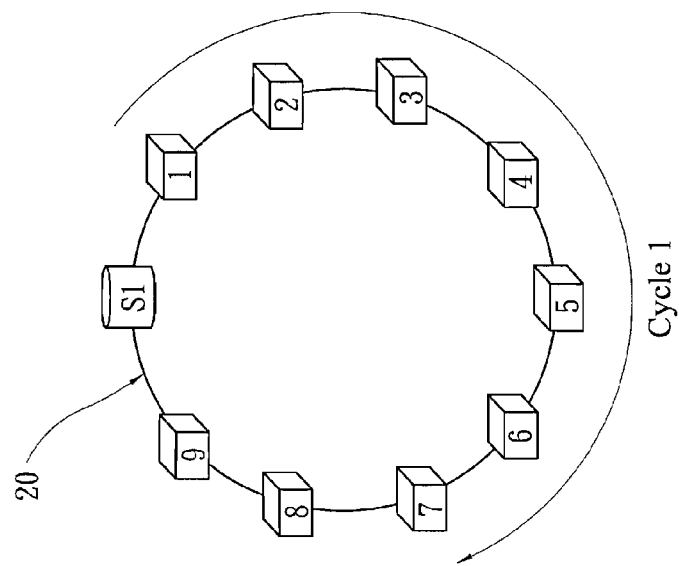
Figures 2, 7:
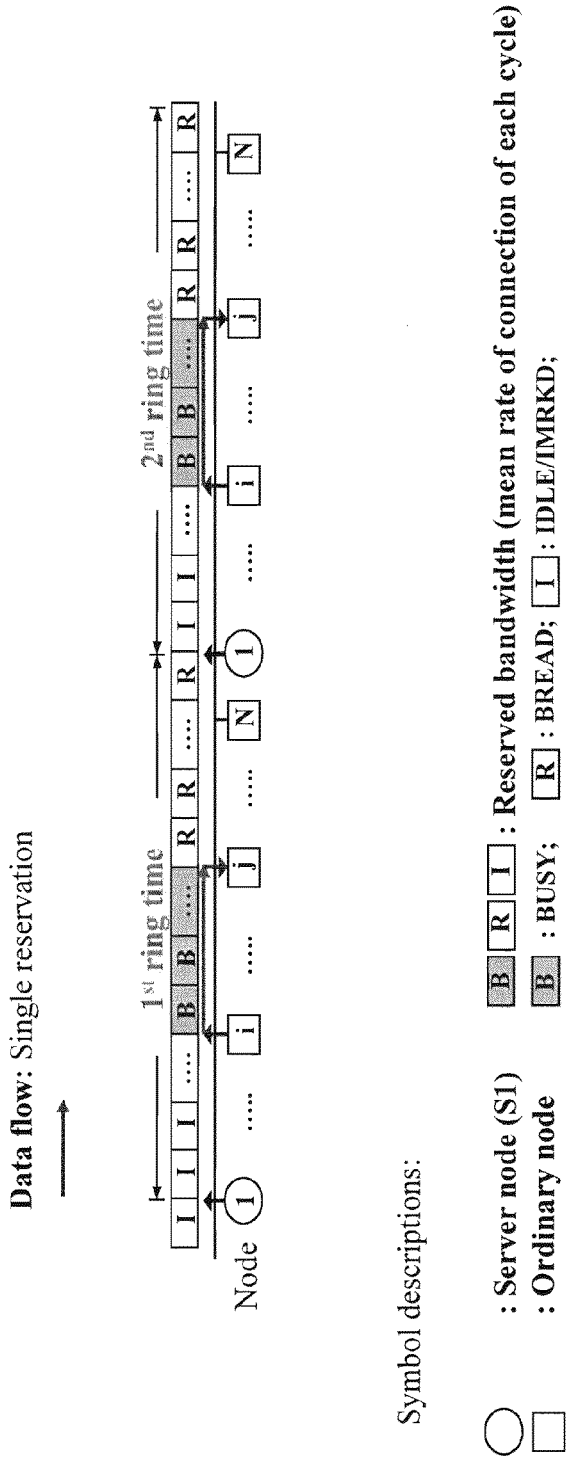
Figures 2, 8:
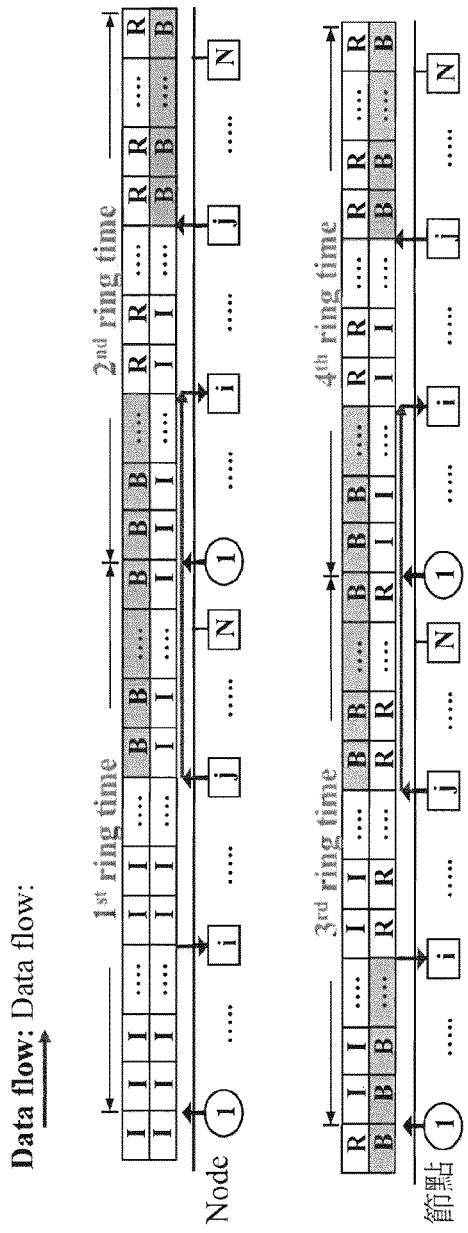

It is assumed that an optical packet-switched ring network comprises nine ordinary nodes Node 1 to Node 9 and one server node s1, the server node s1 has a slot eraser for erasing the data packet that has been read, and the data transmission direction is from Node 1 to Node 9. In a first scenario, it is assumed that Node 1 transmits data to Node 7, that is, an upstream node transmits data to a downstream node, and the data flow is as shown in FIG. 7-2. After Node 1 transmits the data to Node 7 by using a mini-slot with the "status information" marked as IDLE or IMRKD, Node 7 updates the "status information" to BREAD, and the server node s1 uses the slot eraser to erase the data packet that has been read, and updates the "status information" to IDLE, such that Node 1 can reuse the IDLE mini-slot to transmit data in a next ring time. Such a scenario only requires single reservation.

Figures 1, 8:
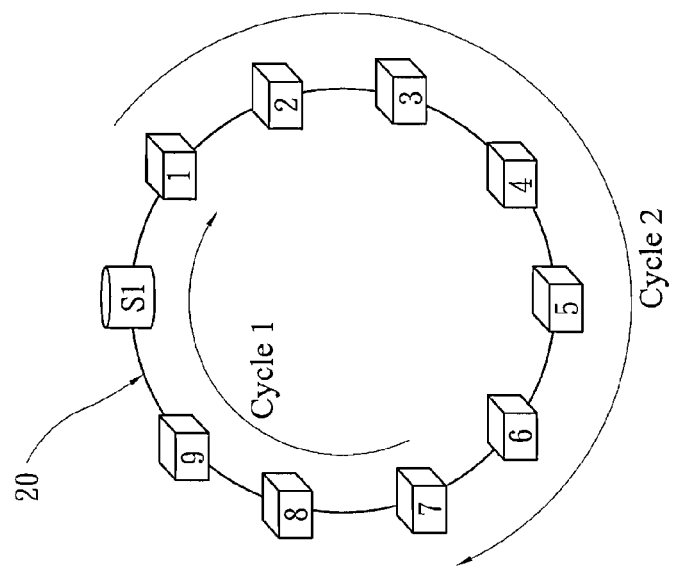

In a second scenario, it is assumed that Node 7 transmits data to Node 1, that is, a downstream node transmits data to an upstream node, and the data flow is as shown in FIG. 8-1. After Node 7 transmits the data to Node 1 by using a mini-slot with the "status information" marked as IDLE or IMRKD, Node 7 updates the "status information" to BREAD. Although data in the data packet has been downloaded by Node 1, the data in the data packet has not been erased by the slot eraser since the data flow has passed through the server node s1. Next time when the data flow passes through Node 7, Node 7 cannot be used to transmit the next data packet, resulting in a transmission delay. Therefore, the CAC module 50 of the disclosure establishes a double reservation connection in such a scenario that a downstream node transmits data to an upstream node, so as to enable Node 7 to transmit data to Node 1 by alternately using two reserved bandwidths in several ring time. The data flow and the use status of each slot are as shown in FIG. 8-2.

The CAC module 50 of the disclosure flexibly allocates the reserved bandwidth to the isochronous traffic initiating the connection establishment request according to a mean rate of connection by a mean-rate-reservation method. Illustration is given below with reference to an example of FIG. 9.

It is assumed that system parameters and architectural data of an optical packet-switched ring network are as follows:

Q=4 (indicating that each cycle has a quota of four packets);

rH=0.5;

R=4 (indicating that a window has four cycles);

N=6 (indicating that the total number of nodes is 6, comprising one server node and five ordinary nodes);

Node 5 has three connection requests c1, c2, and c3 of the isochronous traffic waiting in a queue for connection establishment; and Each connection request has a mean rate of connection of 1 slot/cycle.

It may be calculated according to Formula (1) that the reserved bandwidth is Q×rH=4×0.5=2 (slot/cycle), and the total number of connections to be established allowed by the CAC module 50 according to the mean-rate-reservation method must satisfy the following Formula (3):

$$nh + c.r <= Q \times rH \qquad \text{Formula (3)}$$

nh: is a bandwidth (slot/cycle) occupied by the established connection accepted by the CAC module;

c.r: is a mean rate of connection of the connection establishment request; and

The remaining quota is Q−nh.

Both the connection requests c1 and c2 have a mean rate of connection of 1 (slot/cycle). In the scenario that no connection has been established in the existing reserved bandwidth, according to the conditions of Formula (3), the CAC module 50 only accepts the connection requests c1 and c2, and establishes connections in the reserved bandwidth for the two connection requests c1 and c2, but the connection request c3 that has not been accepted still waits in the queue for the reserved bandwidth released after other connections are terminated. The connection c1 is that Node 5 transmits data to Node 2 (the occupied data packets are marked with "5/2" in FIG. 9), and the connection c2 is that Node 5 transmits data to Node 6 (the occupied data packets are marked with "5/6" in FIG. 9). The connection c1 is a scenario that a downstream node transmits data to an upstream node, so the CAC module 50 flexibly allocates two reserved bandwidths to the connection c1 (that is, two slots may be used within each cycle). The connection c2 is a scenario that an upstream node transmits data to a downstream node, so the CAC module 50 flexibly allocates a single reserved bandwidth to the connection c2.

After accepting a certain connection request according to the mean-rate-reservation method, the CAC module 50 finds mini-slots with the "status information" being IDLE, IMRKD, and BREAD, and establishes a connection without causing receiver contention and transmit contention. The method for establishing the connection is mainly to update the control information in each mini-slot, comprising: the "isochronous traffic priority" in the "bandwidth reservation information" (update the initial value "L" to "H"), the "source node location", and the "destination node location".

The method for determining whether the contentions occur may be to traverse R-Source and R-Destination contents in the "bandwidth reservation information" of each mini-slot in the same control slot 31. Since in the architecture of the optical packet-switched ring network of the disclosure, each node only comprises one tunable transmitter 111 and one tunable receiver 112, more than two data packets cannot be transmitted to the same ordinary node 11 at the same time, and the same ordinary node 11 cannot upload more than two data packets at the same time.

Figure 9:
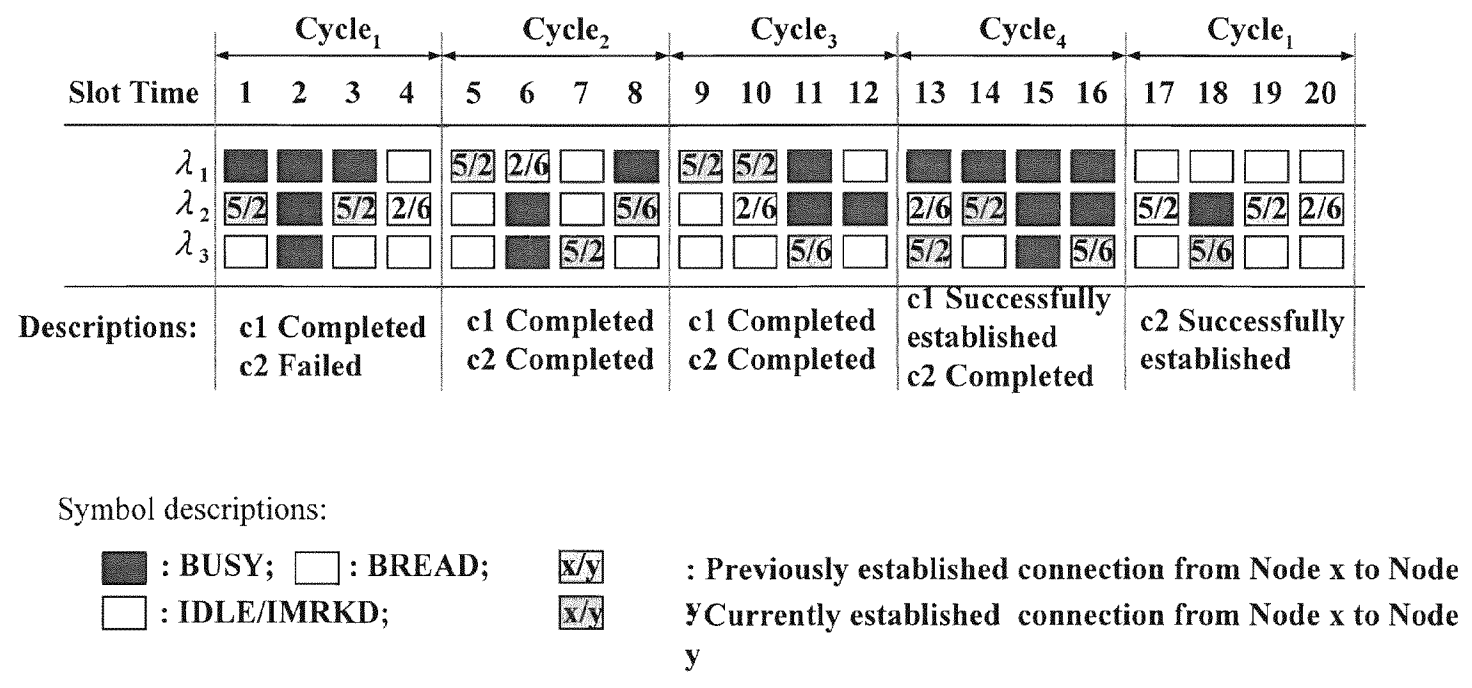

According to the example of FIG. 9, a successfully established connection must successfully find the required mini-slots within four consecutive cycles and complete the update. It should be understood that in the example of FIG. 9, the connection c1 successfully finds two mini-slots required for double reservation within a first cycle (Cycle 1), and also successfully finds the required mini-slots within the following three consecutive cycles (Cycle 2 to Cycle 4), so the establishment of the connection c1 is successfully completed. The connection c2 fails to complete bandwidth reservation within the first cycle (Cycle 1), but successfully completes bandwidth reservation within the second to fourth cycles (Cycle 2 to Cycle 4), so the bandwidth reservation is tried again within the first cycle (Cycle 1) of the next ring time. In other words, if the bandwidth reservation within a certain cycle in a certain ring time fails, the bandwidth reservation must be tried again in the next ring time. For example: if the connection c2 successfully completes the reserved bandwidth within the first, third, and fourth cycles in the first ring time, the bandwidth reservation must be tried again within the second cycle in the next ring time. The connection is not successfully established until the bandwidth reservation has been successfully completed in each cycle. After the connection is successfully established, the source node of the connection checks the mini-slots, and finds its own reserved bandwidth. Then, the source node uses the reserved bandwidth for data transmission, and updates the "status information" to BUSY. After the source node successfully transmits data to the destination node of the connection (that is, the receiving point of the data) according to the above principle, the destination node updates the "status information" to BREAD. After the erasing operation by the server node, the "status information" is updated to IDLE, such that the connection can continue using the reserved bandwidth.

When the traffic connection is finished, the source node must release the connection. The source node updates the "isochronous traffic priority" in the "bandwidth reservation information" of the connection to "L", and cleans up contents of the "source node location" (R-Source) and the "destination node location" (R-Destination).

In the isochronous traffic comprising CBR, VBR, and ABR traffic, the reserved bandwidth in the optical packet-switched ring network is preferably preferentially used by the CBR and VBR isochronous traffic. The remaining quota is provided for excessive ABR and VBR traffic than the reserved bandwidth. Unreserved VBR bandwidth has priority over the ABR.

Theoretically, if all of the available slots are uniformly and fairly allocated to each node, the entire network achieves the maximum output. However, if the transmitting node sequentially acquires empty slots to carry packets thereof, unfair output occurs, especially when the network load is high. The main reason is that within each cycle, if the upstream node in the network sequentially acquires slots for data transmission, the upstream node uses empty slots at the beginning of the cycle first, so that the remaining unused empty slots are present at the end of the cycle and vertically distributed at different wavelengths. As such, the receiver contention and transmit contention easily occur, and the downstream node in the network cannot transmit the maximum amount of data though having a quota, resulting in unfair output of downstream nodes.

Figure 10:
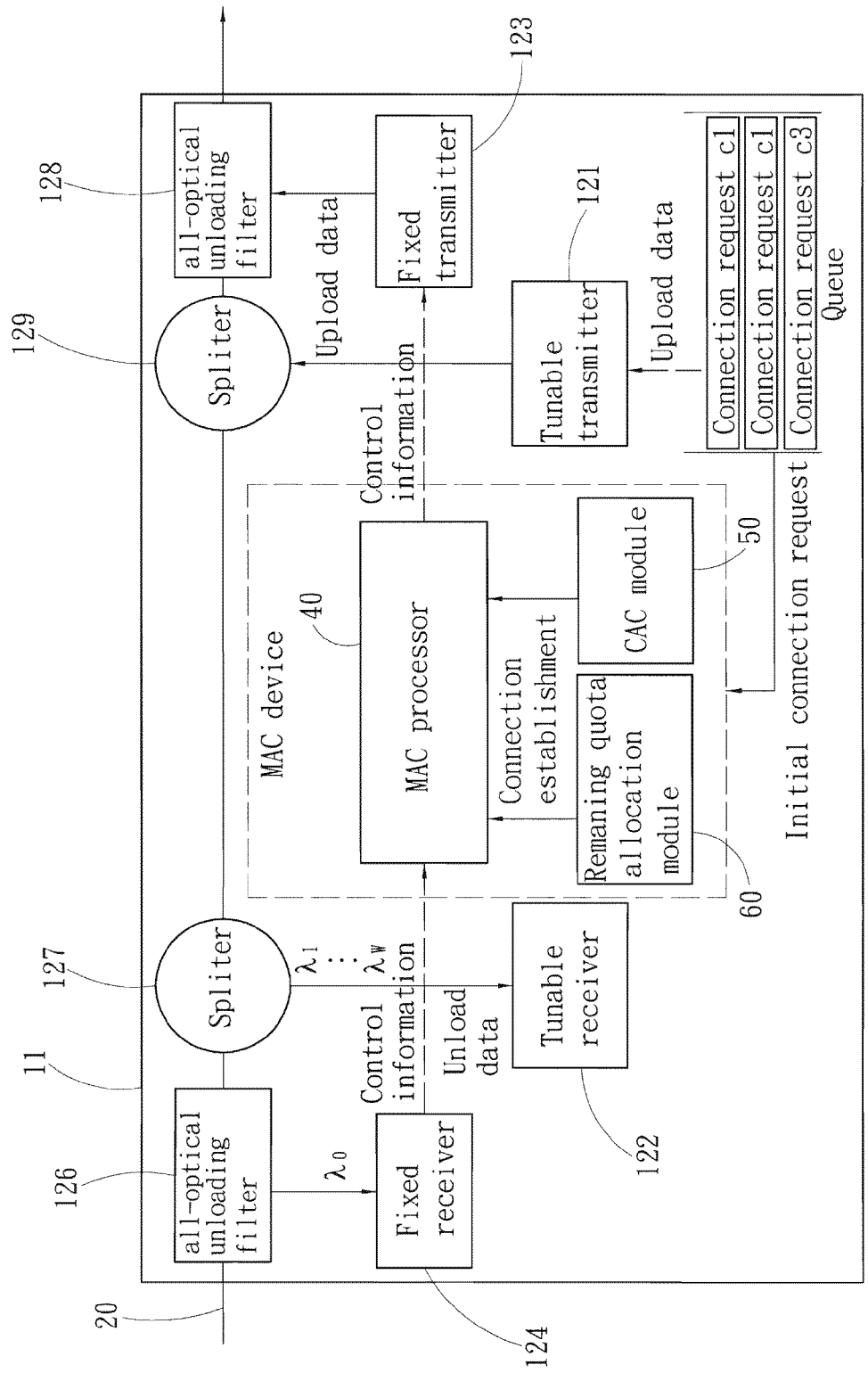
FIG. 10 shows another example of the architecture of the MAC device according to the disclosure.

In order to avoid unfair output, according to another exemplary embodiment of the method of the disclosure, the method further comprises: allocating the remaining quota in accordance with a probabilistic quota and a credit for determine whether transmit extra VBR traffic and ABR traffic by remaining quota. FIG. 10 shows an example of an architecture of an MAC device that allocates the remaining quota in accordance with the probabilistic quota and the credit, which is largely based on the architecture of the MAC device 40 of FIG. 6, and comprises a MAC processor 40, a CAC module 50, and a remaining quota allocation module 60. The remaining quota allocation module 60 functions to allocate the remaining quota in accordance with the probabilistic quota and the credit. Briefly, the allocation of the remaining quota in accordance with the credit means that when the amount of data that a node intends to transmit is smaller than the quota, the node may offer the remaining unused quota to downstream nodes thereof. One implementation is to arbitrarily find mini-slots with the "status information" marked as IDLE equal to the number of the unused quota according to the unused quota, and update the "status information" to IMRKD. The node offering the remaining quota obtains a credit. Therefore, the use of the credit enables a node to transmit data of an amount exceeding the quota thereof within a cycle. In nature, the credit aims to enable all of the unused bandwidths to be used by downstream nodes rather than wasted. For the setting of the cycle length and the window size (ring time) of the credit, the smaller the cycle length, the better the bandwidth sharing, and the larger the window size, the better the bursty traffic adaptation.

For the node that intends to use the remaining quota for data transmission, it needs to determine whether there is an available remaining quota, and determine according to a probability whether data transmission is allowed in the available slots. In other words, the remaining quota allocation module 60 determines according to a probability whether to allow the node to transmit data in the remaining quota by using the credit. A method for setting the probability may be, for example, to divide the quota by the cycle length. Such a method enables data transmission with the entire cycle at random without requiring sequential transmission, thereby eliminating unfair output of downstream nodes in the network, and may also arbitrarily distribute idle bandwidths within the entire cycle, thereby avoiding the receiver contention and transmit contention.

Therefore, if a node having a credit is allowed to transmit data in a slot, the node must determine that the existing IDLE slots or IMRKD slots are available. If it is determined that the existing IDLE slots or IMRKD slots are not available, the node is unconditionally allowed to transmit data in the next slot, that is to say, it does not need to re-determine according to a probability whether the node is allowed to transmit data.

Figure 11:
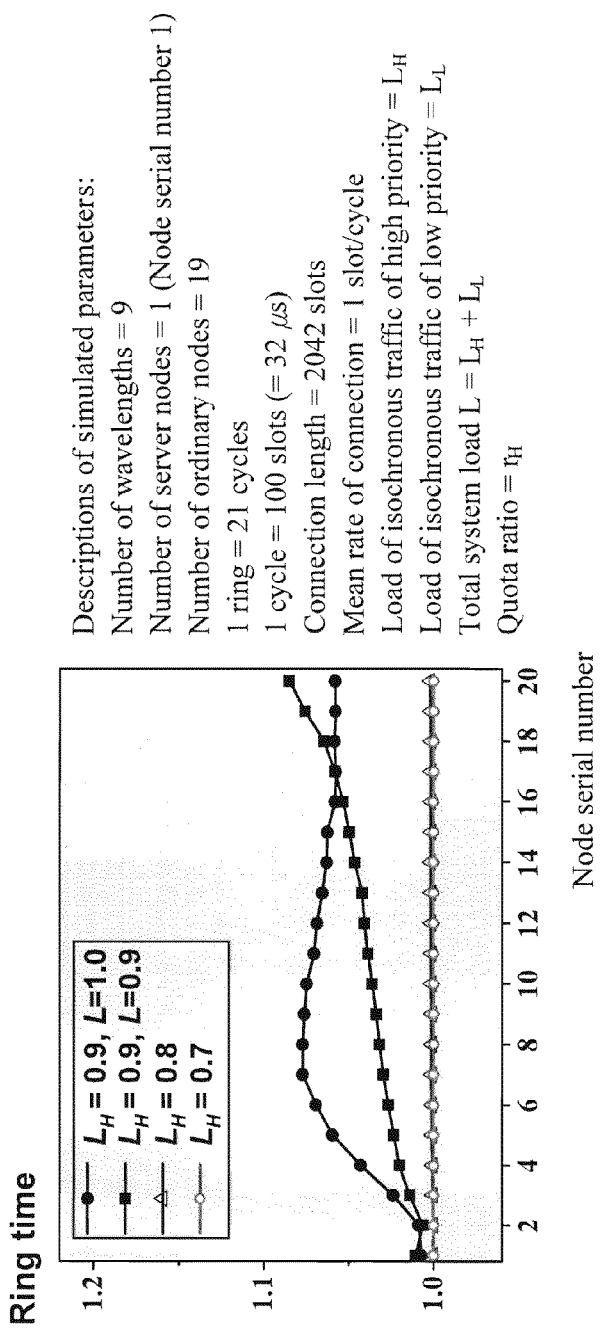
FIG. 11 shows simulated results of a throughput according to the disclosure.

FIG. 11 shows simulated results obtained according to the disclosure. The time required for establishing the reserved bandwidth is simulated. Descriptions of simulated parameters are as follows:

Number of wavelengths =9,
Number of server nodes =1 (Node serial number 1),
Number of ordinary nodes =19,
1 ring =21 cycles,
1 cycle =100 slots (=32 μs),
Connection length =2042 slots,
Mean rate of connection =1 slot/cycle,
Load of isochronous traffic of high priority=$L_H$,
Load of isochronous traffic of low priority=$L_L$,
Total system load L =$L_H$+$L_L$, and
Quota ratio =$r_H$.

It may be found from the results in the figure that, when a load LH of an isochronous traffic of a high priority is 0.7 to 0.8, the reserved bandwidth can be established within 1.0 ring time; and when the load of the isochronous traffic of the high priority is 0.9, the reserved bandwidth can be established within up to 1.1 ring time.

Figure 12:
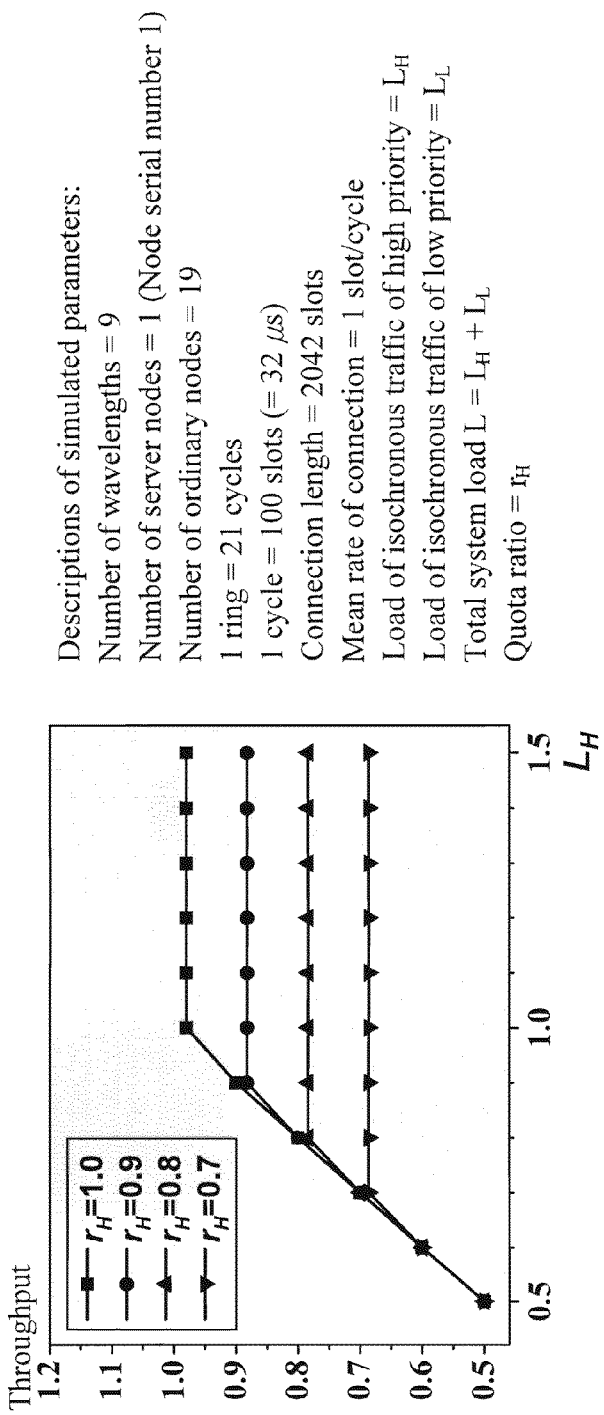
FIG. 12 shows simulated results of a throughput of an isochronous traffic at different quota ratios rH according to the disclosure.
Figures 1, 2, 13:
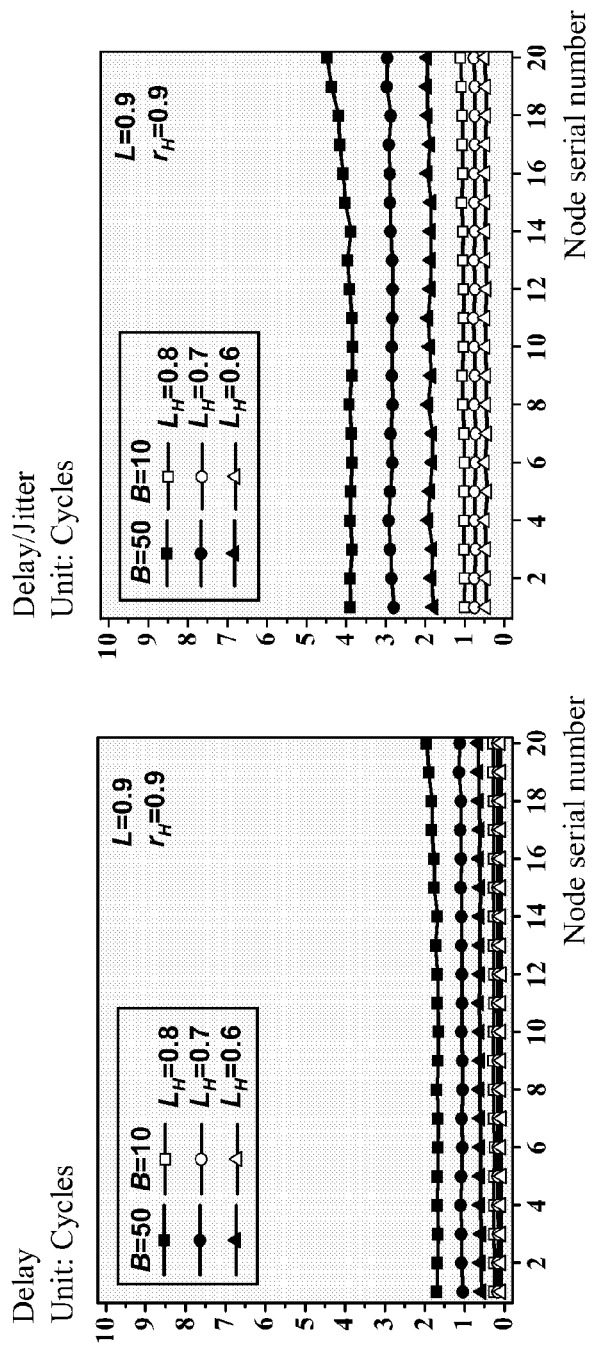

FIG. 12 shows simulated results of a throughput of an isochronous traffic at different quota ratios rH. Descriptions of simulated parameters are as follows:

Number of wavelengths =9,
Number of server nodes =1 (Node serial number 1),
Number of ordinary nodes =19,
1 ring =21 cycles,
1 cycle =100 slots (=32 μs),
Connection length =2042 slots,
Mean rate of connection =1 slot/cycle,
Load of isochronous traffic of high priority =$L_H$,
Load of isochronous traffic of low priority =$L_L$,
Total system load L =$L_H$+$L_L$, and
Quota ratio =$r_H$, It may be found from the simulated results with respect to the delay (FIG. 13-1) and delay/jitter (FIG. 13-2) of a VBR isochronous traffic that, with high isochronous traffic burstness (B=50), when the load $L_H$ of the isochronous traffic of the high priority is 0.6 to 0.7, the delay is still maintained below 1 cycle; and when the load $L_H$ of the isochronous traffic of the high priority reaches 0.9, the delay is still maintained below 2 cycles.

Based on the above, the MAC device and method for optical packet-switched metro WDM slotted-ring networks of the disclosure can flexibly establish a connection for the isochronous traffic, fairly allocate the bandwidth, and provide QoS guarantees for the isochronous traffic, thereby achieving high data output and low delay and delay/jitter.

What is claimed is:

1. A medium access control (MAC) device for optical packet-switched metro wavelength division multiplexing (WDM) slotted-ring networks, applied in a node of an optical packet-switched metro WDM slotted-ring network, for providing data transmission services, the device comprising:

a call admission control (CAC) module, configured in the node of the optical packet-switched metro WDM slotted-ring network in a distributed manner, wherein the CAC module flexibly allocates a reserved bandwidth to an isochronous traffic by a mean-rate-reservation method, controls a quota of the isochronous traffic below the reserved bandwidth, determines whether to accept a connection establishment request initiated by the isochronous traffic and determines the reserved bandwidth according to the following Formula (1), where Q is a quota of the node within a single cycle, and rH is a quota ratio having a value of 0 to 1:

$$rH \times Q \qquad \text{Formula (1); and}$$

a MAC processor, for establishing a connection in the reserved bandwidth for the isochronous traffic accepted by the CAC module according to control information recorded in a control slot in a control channel, controlling data uploading, unloading, and erasing of a plurality of data channels, and updating corresponding contents in the control information.

2. The MAC device for optical packet-switched metro WDM slotted-ring networks according to claim 1, wherein the optical packet-switched metro WDM slotted-ring network comprises two types of nodes, namely, ordinary nodes and server nodes, the nodes are connected with each other through at least one optical fiber to form a ring network, and each optical fiber carries the control channel and the plurality of data channels.

3. The MAC device for optical packet-switched metro WDM slotted-ring networks according to claim 2, wherein the MAC processor disposed in the ordinary node performs data uploading through a tunable transmitter, performs data unloading through a tunable receiver, and performs transmission and receiving of a control signal in the control channel through a fixed transmitter and a fixed receiver.

4. The MAC device for optical packet-switched metro WDM slotted-ring networks according to claim 2, wherein the MAC processor disposed in the server node performs data uploading through a tunable transmitter, performs data unloading through a tunable receiver, performs erasing through an optical slot eraser, and performs transmission and receiving of a control signal in the control channel through a fixed transmitter and a fixed receiver.

5. The MAC device for optical packet-switched metro WDM slotted-ring networks according to claim 1, wherein the data channels and the control channel are respectively divided into a plurality of data packets and the corresponding control slot by a slot having a fixed time length at a synchronous position, the control slot comprises a plurality of mini-slots and a header, the mini-slots respectively record the control information of the data packets in the corresponding data channels at the synchronous position, and a structure of the control information comprises: "bandwidth reservation information" (Reservation), "destination address information" (Destination Address), and "status information" (Status).

6. The MAC device for optical packet-switched metro WDM slotted-ring networks according to claim 5, wherein the status information comprises: BUSY, BUSY/READ (BREAD), IDLE, and Idle Marked (IMRKD).

7. The MAC device for optical packet-switched metro WDM slotted-ring networks according to claim 5, wherein the bandwidth reservation information comprises: "isochronous traffic priority" (H/L), "H" indicating that the isochronous traffic is of a high priority, "L" indicating that the isochronous traffic is of a low priority, and "L" being used as an initial value; "source node location" (R-Source), and "destination node location" (R-Destination).

8. The MAC device for optical packet-switched metro WDM slotted-ring networks according to claim 5, wherein the MAC processor traverses contents of the control information, and establishes the connection if no receiver contention or transmit contention occurs.

9. The MAC device for optical packet-switched metro WDM slotted-ring networks according to claim 1, wherein the mean-rate-reservation method is accepting the connection establishment request initiated by the isochronous traffic when the following formula is satisfied:

$$nh+c.r <= \text{Reserved Bandwidth} \quad \text{Formula (3)},$$

where nh is a bandwidth (slot/cycle) occupied by the established connection accepted by the CAC module; and c.r is a mean rate of connection of the isochronous traffic initiating the connection establishment request.

10. The MAC device for optical packet-switched metro WDM slotted-ring networks according to claim 9, wherein the credit is a remaining quota offered by the node, and the remaining quota allocation module determines according to a probability whether to allow the node to transmit data in the remaining quota by using the credit.

11. The MAC device for optical packet-switched metro WDM slotted-ring networks according to claim 1, further comprising: a remaining quota allocation module, which in accordance with a probabilistic quota and credits to determine whether transmit unreserved traffic by remaining quota.

12. A medium access control (MAC) method for optical packet-switched metro wavelength division multiplexing (WDM) slotted-ring networks, applied in a node of an optical packet-switched metro WDM slotted-ring network, for providing data transmission services, the method comprising:
  A. establishing control information corresponding to a data packet in the network, wherein the control information comprises: "bandwidth reservation information" (Reservation), "destination address information" (Destination Address), and "status information" (Status);
  B. determining a reserved bandwidth and a remaining quota according to a quota Q of the node within a single cycle and a quota ratio rH;
  C. flexibly allocating the reserved bandwidth to an isochronous traffic initiating a connection establishment request by a mean-rate-reservation method; and
  D. establishing a connection for the isochronous traffic in the reserved bandwidth.

13. The MAC method for optical packet-switched metro WDM slotted-ring networks according to claim 12, wherein the bandwidth reservation information comprises: "isochronous traffic priority" (H/L), "H" indicating that the isochronous traffic is of a high priority, "L" indicating that the isochronous traffic is of a low priority, and "L" being used as an initial value; "source node location" (R-Source), and "destination node location" (R-Destination).

14. The MAC method for optical packet-switched metro WDM slotted-ring networks according to claim 12, wherein the status information comprises: BUSY, BUSY/READ (BREAD), IDLE, and Idle Marked (IMRKD).

15. The MAC method for optical packet-switched metro WDM slotted-ring networks according to claim 12, wherein the reserved bandwidth is determined according to the following Formula (1), where Q is the quota of the node, and rH is the quota ratio having a value of 0 to 1:

$$rH \times Q \quad \text{Formula (1)}.$$

16. The MAC method for optical packet-switched metro WDM slotted-ring networks according to claim 12, wherein the mean-rate-reservation method is accepting the connection establishment request initiated by the isochronous traffic when the following formula is satisfied:

$$nh+c.r <= \text{Reserved Bandwidth} \quad \text{Formula (3)},$$

where nh is a bandwidth (slot/cycle) occupied by the established connection accepted by a call admission control (CAC) module; and c.r is a mean rate of connection of the isochronous traffic initiating the connection establishment request.

17. The MAC method for optical packet-switched metro WDM slotted-ring networks according to claim 12, wherein Step C further comprises traversing the control information, and establishing the connection if no receiver contention or transmit contention occurs.

18. The MAC method for optical packet-switched metro WDM slotted-ring networks according to claim 12, further comprising: allocating the remaining quota in accordance with a probabilistic quota and a credit for determine whether transmit unreserved traffic by remaining quota.

19. The MAC method for optical packet-switched metro WDM slotted-ring networks according to claim 18, wherein the credit is a remaining quota offered by the node, and it is determined according to a probability whether to allow the node to transmit data in the remaining quota by using the credit.

* * * * *